(12) United States Patent
Eyhorn et al.

(10) Patent No.: US 6,180,927 B1
(45) Date of Patent: Jan. 30, 2001

(54) HEAT INSULATING MOULDED BODY AND PROCESS FOR PRODUCING THE SAME

(75) Inventors: Thomas Eyhorn, Altusried; Gunter Kratel, Durach; Johann Klaus, Sulzberg; Robert Kicherer, Oberderdingen; Bernhard Mikschl, Baden; Eugen Wilde, Knittlingen, all of (DE)

(73) Assignee: Wacker-Chemie GmbH, München (DE)

( * ) Notice: Under 35 U.S.C. 154(b), the term of this patent shall be extended for 0 days.

(21) Appl. No.: 09/284,788

(22) PCT Filed: Oct. 23, 1997

(86) PCT No.: PCT/EP97/05853

§ 371 Date: Apr. 20, 1999

§ 102(e) Date: Apr. 20, 1999

(87) PCT Pub. No.: WO98/17596

PCT Pub. Date: Apr. 30, 1998

(30) Foreign Application Priority Data

Oct. 24, 1996 (DE) .............................. 196 44 282

(51) Int. Cl.[7] .............................. H05B 3/68; C04B 35/52
(52) U.S. Cl. .......................... 219/461.1; 501/87; 501/94
(58) Field of Search ............................... 219/460.1, 461.1, 219/462.1, 465.1, 466.1, 467.1, 468.1; 501/80, 87, 88, 89, 94, 95.1, 96.1, 96.3; 428/426

(56) References Cited

U.S. PATENT DOCUMENTS

| | | |
|---|---|---|
| 4,713,527 | 12/1987 | Kicherer et al. . |
| 5,302,444 * | 4/1994 | Jackson et al. ....................... 428/426 |
| 5,439,624 * | 8/1995 | Anderson et al. ..................... 501/80 |
| 5,498,854 * | 3/1996 | McWilliams ....................... 219/461.1 |
| 5,517,002 * | 5/1996 | Higgins ............................. 219/462.1 |
| 5,532,458 * | 7/1996 | Kratel et al. ....................... 219/460.1 |

FOREIGN PATENT DOCUMENTS

| | | |
|---|---|---|
| 0 560 479 B1 | 2/1993 | (EP) . |
| 0 204 185 | 5/1996 | (EP) . |

* cited by examiner

Primary Examiner—Sang Paik
(74) Attorney, Agent, or Firm—Brooks & Kushman P.C.

(57) ABSTRACT

A heat insulating molded body made of inorganic material and inorganic reinforcement fibers is disclosed, as well as a process for producing the same and its use. The molded body is characterized by the following composition: (a) 30–70 wt. % blown vermiculite; (b) 15–40 wt. % inorganic binder; (c) 0–20 wt. % infrared opacifier; (d) 15–50 wt. % microporous material; (e) 0.5–8 wt. % reinforcement fibers which contain maximum 2 wt. % $B_2O_3$ and at most 2% alkalimetal oxide, based on the weight of the reinforcing fibers.

6 Claims, 1 Drawing Sheet

HEAT INSULATING MOULDED BODY AND PROCESS FOR PRODUCING THE SAME

TECHNICAL FIELD

The invention relates to a thermally insulating molded body comprising inorganic material and inorganic reinforcing fibers and to a process for producing the molded bodies. In particular, the invention relates to a thermally insulating molded body which is suitable as a spacer in radiative heating elements for cooking appliances and ovens.

DESCRIPTION OF THE RELATED ART

Such a spacer has to meet particularly demanding requirements:

it has to have a high degree of mechanical stability while still being sufficiently elastic to survive automated installation in a radiative heating element without damage and to be able to be permanently pressed against the underside of a ceramic hob;

it must give off no substances which are hazardous to health, for example pieces of fibers which can enter the lungs;

it must not be a source of substances which impair the function or life of articles such as heating bands or heating spirals when these articles come into contact with these substances;

it must provide particularly efficient thermal insulation so that the heat produced by the heating element can be utilized for cooking or baking without substantial losses;

it has to be an electrical insulator;

it must retain its mechanical and physical properties over a wide temperature range.

EP-204 185 A1 describes a radiative heating element comprising a molded body referred to as a pot rim which is also used as spacer. The pot rim consists essentially of particles of expanded mica, e.g. vermiculite, which have been pressed together with a binder. This material meets the criterion of sufficient mechanical stability. Its thermal insulation properties no longer meet the minimum requirements which apply today.

SUMMARY OF THE INVENTION

EP-560 479 B1 describes an annular, thermally insulating spacer and its use as spacer. The molded body comprises an intimate mixture of microporous material and certain reinforcing glass fibers such as E-glass fibers. This molded body meets, in particular, the requirements in respect of thermal insulation. However, its mechanical stability is significantly less than that of a comparable molded body made of vermiculite pressed together with binder. In addition, experiments on the glass fiber-reinforced molded body have indicated that its use reduces the life of heating bands or heating spirals used in radiative heating elements. It has been found that the sometimes very thin heating bands or heating spirals corrode and burn through relatively quickly at places at which material abraded from the molded body has deposited. Such abraded material cannot be avoided, since it is formed, for example, when the molded body is installed in the radiative heating element, during transport of the radiative heating element and on drilling holes in the thermal insulation of the radiative heating element.

The invention relates to a molded body which is particularly suitable with regard to the requirements mentioned at the outset.

The invention provides a thermally insulating molded body comprising inorganic material and inorganic reinforcing fibers, which is characterized by the following, weight-based composition:

a) 30–70% of expanded vermiculite b) 15–40% of inorganic binders c) 0–20% of infrared opacifier d) 15–50% of microporous material e) 0.5–8% of reinforcing fibers containing not more than 2% of $B_2O_3$ and not more than 2% of alkali metal oxides, based on the weight of the reinforcing fibers.

DESCRIPTION OF THE PREFERRED EMBODIMENTS

Figure 1:
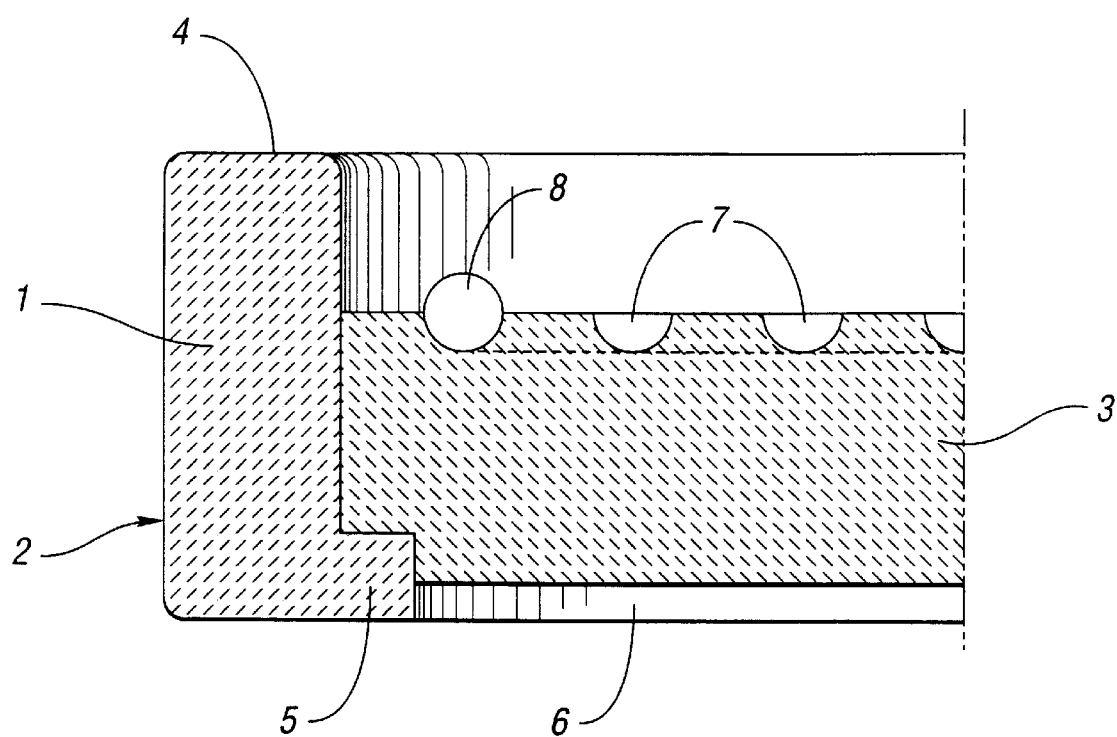
FIG. 1 illustrates one embodiment of a molded body produced in accordance with the subject invention.

The molded body meets all the requirements mentioned at the outset in an above-average way. It is therefore most suitable for use as a spacer in radiative heating elements of cooking appliances and ovens. Particular mention should be made of its excellent mechanical strength and flexibility and the fact that its constituents do not reduce the life of heating bands or heating spirals. The latter property is first and foremost linked to the choice of reinforcing fibers. Unlike, for example, E-glass fibers, the reinforcing fibers chosen do not attack heating bands or heating spirals at operating temperature. E-glass comprises, according to manufacturers' data, the following main constituents (figures in % by weight):

$SiO_2$: 52–56%

CaO: 16–25%

$TiO_2$: 0–1.5%

$Al_2O_3$: 12–16%

MgO: 0–5%

$Na_2O+K_2O$: 0–2%

$B_2O_3$: 5–10%

ZnO: 0

The molded body contains various constituents which add up to 100 parts by weight. 30–70 parts by weight are expanded vermiculite. Preference is given to using vermiculite grades having a particle size of 0–2, so that the diameter of the vermiculite particles in the molded body is typically from 0.2 to 5 mm. If appropriate, vermiculite particles which have sizes above or below the particular limits or foreign materials are removed by sieving or classification before production of the molded body. Magnetic contaminants, for example iron-containing material, can also be removed using a magnetic separator.

In addition, the molded body contains 15–40 parts by weight of an inorganic binder. Preference is given to water glasses, silica sols, aqueous phosphate binders and similar binders. A particularly suitable binder is the potassium water glass of the specification K28 from Silbermann, Gablingen, Germany.

BRIEF DESCRIPTION OF THE DRAWING

If desired, the molded body may also contain up to 20 parts by weight of an infrared opacifier. Suitable opacifiers are ilmenite, rutile, titanium dioxide, silicon carbide, iron (II)–iron(III) mixed oxides, chromium dioxide, zirconium oxide, manganese dioxide, iron oxide and zirconium silicate, and also mixtures thereof. Particular preference is given to using ilmenite, rutile and zirconium silicate.

The molded body additionally contains 15–50 parts by weight of a microporous material. Preference is given to oxides having specific surface areas measured by the BET method of preferably 50–700 m$^2$/g, in particular pyrogenic silicas including electric arc silicas, low-alkali precipitated silicas, silicon dioxide aerogels and aluminum oxides and also mixtures of the materials mentioned. Particular preference is given to pyrogenic silicas or precipitated silicas or mixtures thereof.

The molded body also contains 0.5–8 parts by weight of reinforcing fibers which, based on the fiber weight, contain not more than 2% of $B_2O_3$ and not more than 2% of alkali metal oxides. Preference is given to fibers of silica, fused quartz, R-glass, S2-Glass®, ECRGLAS® and similar glasses, and any mixtures of these fibers. The fiber diameter is preferably 3–20 μm and the fiber length is preferably 1–25 mm. According to manufacturers' data, R-glass, S2-Glass® and ECRGLAS® comprise the following main constituents (figures in % by weight):

|  | R-glass | S2-Glass ® | ECRGLAS ® |
|---|---|---|---|
| $SiO_2$: | 55–65% | 64–66% | 54–62% |
| $Al_2O_3$: | 15–30% | 24–25% | 9–15% |
| $B_2O_3$ | 0 | 0 | 0 |
| CaO: | 9–25% | 0–0.1% | 17–25% |
| MgO: | 3–8% | 9.5–10% | 0–4% |
| ZnO: | 0 | 0 | 2–5% |
| $TiO_2$: | 0 | 0 | 0–4% |
| $Na_2O + K_2O$: | 0–1% | 0–0.2% | 0–2% |

The production of the molded body is of particular importance because microporous material quickly loses its thermal insulation properties on contact with water.

The invention therefore also provides a process for producing a thermally insulating molded body comprising inorganic material and inorganic reinforcing fibers, which is characterized by the following sequence of process steps:
a) mixing 30–70 parts by weight of expanded vermiculite with 15–40 parts by weight of an inorganic binder to give a free-flowing premix,
b) mixing 15–50 parts by weight of microporous material, 0.5–8 parts by weight of reinforcing fibers and, if desired, up to 20 parts by weight of infrared opacifier into the premix prepared as described in a), where the reinforcing fibers contain, based on their own weight, not more than 2% of $B_2O_3$ and not more than 2% of alkali metal oxides and the mixed constituents add up to 100 parts by weight in the final mixture,
c) pressing the final mixture to form a thermally insulating molded body and
d) curing and drying the molded body at temperatures up to 1000° C.

The water-containing inorganic binder is soaked up by the vermiculite on being premixed with it, so that the premix remains free-flowing and behaves like a dry mixture. The water-sensitive microporous material, which is mixed only into the premix, retains its thermal insulation properties. When the final mixture is pressed, water glass comes out of the vermiculite particles and binds the vermiculite particles in the region of their particle boundaries to the other constituents of the final mixture. In this process too, the thermal insulation action of the microporous material is almost fully retained.

Turning now to the drawing, FIG. 1 shows a dish-shaped enclosure of the highly porous inorganic material. It is advantageous to select the shape of the enclosure in such a way that the side wall 1 of the enclosure 2, which in the operating state surrounds the insulator 3, projects above the highest point of the hearing element, performing the object of a spacer. In the operating state, a glass-ceramic hot plate can then rest on the surface 4 of the side wall. In principle, such a dish-shaped enclosure can also be constructed of two or more shaped parts which can be put together. A further embodiment of the dish-shaped enclosure relates to the bottom 5, which can, but does not have to be in the form of a full sheet.

The following examples/comparative examples illustrate the advantages of the invention.

COMPARATIVE EXAMPLE 1

A mixture of

46% by weight of expanded vermiculite of the particle size "0" special, obtained from Kramer Progetha, Düsseldorf, Germany, 24% by weight of water glass "K28", obtained from Silbermann, Gablingen, Germany, 26% by weight of pyrogenic silica "N25", obtained from Wacker-Chemie GmbH, Munich, Germany, and 4% by weight of reinforcing fibers of E-glass (length: 6 mm), obtained from STW, Schenkenzell, Germany, was prepared as in the process claimed, pressed axially to form a ring having a density of about 700 kg/m$^3$ and dried at a temperature of 500° C. The ring was subsequently ground to a fine dust. Small amounts of the dust were then sprinkled into a radiative heating element containing a thin heating band which had a glow time of 3–6 seconds. The radiative heating element was finally subjected to a long-term test and it was found that the first signs of corrosion could be seen on the heating band after an operating time of about 800 hours and these led to failure of the heating band after a further 1000 hours of operation.

EXAMPLE 2

In a further experiment, S2-Glass® fibers (length: 6 mm), obtained from Owens Corning, Wiesbaden, Germany, had been used as reinforcing fibers for producing a spacing ring. Otherwise, the experimental conditions had not been changed from those of Comparative Example 1). In this case, however, no corrosion could be detected on the heating band of the radiative heating element.

COMPARATIVE EXAMPLE 3a

E-glass fibers (of the same type as those in Comparative Example 1) were sprinkled into a radiative heating element (likewise of the same type as that of Comparative Example 1). After an operating time of 280 hours, the heating band had been so severely attacked by molten glass which wetted it that it burned through at a point wetted by glass.

COMPARATIVE EXAMPLE 3b

In an experiment analogous to Comparative Example 3a), the sprinkling of C-glass, obtained from Schuller, Wertheim, Germany, into a radiative heating element led to destruction of the heating band after an operating time of 145 hours.

According to the manufacturer's data, C-glass comprises the following main constituents (figures in % by weight):

| | | |
|---|---|---|
| SiO$_2$: 64–68% | Al$_2$O$_3$: 3–5% | B$_2$O$_3$: 4–6% |
| CaO: 11–15% | MgO: 2–4% | ZnO: 0 |
| TiO$_2$: 0 | ZrO$_2$: 0 | Na$_2$O + K$_2$O: 7–10% |

COMPARATIVE EXAMPLE 3c

In an experiment analogous to Comparative Example 3a), the heating band failed after only 35 hours of operation. In place of the E-glass fibers of Comparative Example 3a), fibers of AR-glass, obtained under the trade name "Cemfill" from STW, Schenkenzell, Germany, had been tested.

According to the manufacturer's data, AR-glass comprises the following main constituents (figures in % by weight):

| | | |
|---|---|---|
| SiO$_2$: 55–75% | Al$_2$O$_3$: 0–5% | B$_2$O$_3$: 0–8% |
| CaO: 1–10% | MgO: — | ZnO: — |
| TiO$_2$: 0–12% | ZrO$_2$: 1–18% | Na$_2$O + K$_2$O: 11–21% |

EXAMPLE 4a

In an experiment analogous to Comparative Example 3a), S2-Glass® fibers (length: 6 mm), obtained from Owens Corning, Wiesbaden, Germany, were sprinkled into a radiative heating element in place of E-glass fibers. After 1500 hours of operation, the heating band had been neither wetted by the glass nor corroded.

EXAMPLE 4b

In an experiment analogous to Comparative Example 3a), R-glass fibers (length: 6 mm), obtained from Vetrotex, Herzogenrath, Germany, were sprinkled into a radiative heating element in place of E-glass fibers. After 1500 hours of operation, the heating band had been neither wetted by the glass nor corroded.

EXAMPLE 4c

In an experiment analogous to Comparative Example 3a), silica fibers (length: 6 mm), obtained under the trade name "Asilfaser" from Asglawo, Freiberg, Germany, were sprinkled into a radiative heating element in place of E-glass fibers. After 1500 hours of operation, the heating band had been neither wetted by the glass nor corroded. According to the manufacturer's data, the silica fibers used comprised 98% of SiO$_2$.

COMPARATIVE EXAMPLE 5a

Using a method similar to that described in EP-204185 A1, a spacing ring was produced by pressing vermiculite and water glass and its flexural strength and thermal conductivity were examined.

COMPARATIVE EXAMPLE 5b

Using a method similar to that described in EP-560479 B1, a spacing ring was produced by pressing microporous material and E-glass fibers and its flexural strength and thermal conductivity were examined.

EXAMPLE 6

The flexural strength and thermal conductivity of a spacing ring according to the invention, produced as described in Example 2), were likewise examined.

The result of the tests as described in Comparative Examples 5a) and 5b) and Example 6) is summarized below (FS=flexural strength, TC-RT=thermal conductivity at room temperature):

| | FS (N/mm$^2$) | TC-RT (W/mK) |
|---|---|---|
| Comparative Example 5a) | ca. 2 | ca. 0.2 |
| Comparative Example 5b) | ca. 0.2 | ca. 0.03 |
| Example 6 | ca. 0.8 | ca. 0.06 |

What is claimed is:

1. A thermally insulating molded spacer in radiative heating elements for cooking appliances and for ovens comprising consolidated inorganic material and inorganic reinforcing fibers, said spacer comprising, in weight percent based on the total weight of said molded body,
    a) 30–70% of expanded vermiculite,
    b) 15–40% of inorganic binders,
    c) 0–20% of infrared opacifier,
    d) 15–50% of microporous material, and
    e) 0.5–8% of reinforcing fibers containing not more than 2% of B$_2$O$_3$ and not more than 2% of alkali metal oxides, based on the weight of the reinforcing fibers.

2. A molded body according to claim 1, characterized in that the reinforcing fibers are selected from the group consisting of fibers of silica, fused silica, glasses A–C having the following composition of main glass constituents, in parts by weight:

| | A | B | C |
|---|---|---|---|
| SiO$_2$ | 55–65% | 64–66% | 54–62% |
| Al$_2$O$_3$: | 15–30% | 24–25% | 9–15% |
| B$_2$O$_3$ | 0 | 0 | 0 |
| CaO: | 9–25% | 0.0.1% | 17–25% |
| MgO: | 3–8% | 9.5–10% | 0–4% |
| ZnO | 0 | 0 | 2–5% |
| TiO$_2$ | 0 | 0 | 0–4% |
| Na$_2$O + K$_2$O: | 0–1% | 0–0.2% | 0–2%, | and any mixtures of these fibers.

3. Process for producing a thermally insulating molded spacer for radiative heating elements for cooking appliances and for ovens comprising inorganic material and inorganic reinforcing fibers, characterized by the following steps:
    a) mixing 30–70 parts by weight of expanded vermiculite with 15–40 parts by weight of an inorganic binder to give a free-flowing premix,
    b) mixing 15–50 parts by weight of microporous material, 0.5–8 parts by weight of reinforcing fibers and, if desired, up to 20 parts by weight of infrared opacifier into the premix prepared as described in a), where the reinforcing fibers contain, based on their own weight, not more than 2% of B$_2$O$_3$ and not more than 2% of alkali metal oxides and the mixed constiuents add up to 100 parts by weight in the final mixture.
    c) pressing the final mixture to form a thermally insulating molded body and
    d) curing and drying the molded body at temperatures up to 1000° C.

4. In a heating device containing radiative heating elements positioned by one or more spacers, the improvement comprising employing as at least one spacer, a spacer according to claim 1.

5. In a heating device containing radiative heating elements positioned by one or more spacers, the improvement comprising employing as at least one spacer, a spacer according to claim 2.

6. A thermally insulating molded body, said body comprising the binder-consolidated product obtained by curing and drying at elevated temperatures up to 1000° C. of a composition comprising:
   a) 39–70% of expanded vermiculite having a particle size range about 0.2 mm to about 5 mm;
   b) 15–40% of inorganic binder(s);
   c) an infrared opacifier in an amount of up to 20%;
   d) 15–50% of microporous material; and
   e) 0.5 to 8% of reinforcing fibers, said fibers containing not more than 2% boron and not more than 2% alkali metal oxides, wherein all percents are percents by weight relative to the weight of the insulating body.

* * * * *

UNITED STATES PATENT AND TRADEMARK OFFICE
CERTIFICATE OF CORRECTION

PATENT NO. : 6,180,927 B1
DATED : January 30, 2001
INVENTOR(S) : Eyhorn et al.

It is certified that error appears in the above-identified patent and that said Letters Patent is hereby corrected as shown below:

<u>Column 6,</u>
Line 26, delete "molded body" and insert -- spacer --.
Line 58, "constiuents" should be -- constituents --.
Line 59, after "mixture" delete the "." and insert a -- , --.
Line 67, before "according" insert -- which is a molded body --.

<u>Column 7,</u>
Line 4, before "according" insert -- which is a molded body --.

Signed and Sealed this

Twenty-first Day of August, 2001

Attest:

*Nicholas P. Godici*

NICHOLAS P. GODICI
*Attesting Officer*    *Acting Director of the United States Patent and Trademark Office*